United States Patent [19]

Nishiyama et al.

[11] Patent Number: 4,838,087

[45] Date of Patent: Jun. 13, 1989

[54] QUAD DISK STATIC PRESSURE PROBE

[75] Inventors: Randall T. Nishiyama; Alfred J. Bedard, Jr., both of Boulder, Colo.

[73] Assignees: The United States of America as represented by the Secretary of Commerce, Washington, D.C.; Univ. of Colo. Found., Inc., Boulder, Colo.

[21] Appl. No.: 210,546

[22] Filed: Jun. 23, 1988

[51] Int. Cl.⁴ .......................... G01L 7/00; G01P 5/165
[52] U.S. Cl. .................................. 73/700; 73/170 R; 73/861.65
[58] Field of Search ...................... 73/170 R, 182, 384, 73/700, 861.65

[56] References Cited

U.S. PATENT DOCUMENTS

| 3,034,353 | 5/1962 | Anderson | 73/861.65 |
| 3,673,866 | 7/1972 | Alperovich et al. | 73/861.65 |
| 3,950,995 | 4/1976 | Marshall | 73/861.65 X |

OTHER PUBLICATIONS

R. W. Miksad, *Journal of Applied Meteorology*, vol. 15, No. 11, Nov. 1976, pp. 1215–1225.

G. C. Gill, "Development and Testing of . . . Ocean Buoys", University of Mich. Research Paper, 8/1976.

*Primary Examiner*—Charles A. Ruehl
*Attorney, Agent, or Firm*—Thomas Zack; Alvin Englert; William H. Wright

[57] ABSTRACT

A quad disk static pressure probe apparatus (10) including: a hollow stem member (15) having a plurality of static pressure ports (16) disposed on its periphery; an apertured collar unit (14) surrounding the stem member (15) and being in open fluid communication with the static pressure ports (16); and, inner (21) and outer (18) pairs of disk members operatively secured to the stem member (15) above and below the location of the static pressure ports (16).

11 Claims, 2 Drawing Sheets

QUAD DISK STATIC PRESSURE PROBE

TECHNICAL FIELD

The present invention relates to the field of static pressure probes in general, and more specifically to a static pressure probe that is not particularly sensitive to different angle-of-attack wind components.

BACKGROUND OF THE INVENTION

In the field of meteorology one of the most persistent and vexing problems has been the lack of a static pressure probe configuration that is omni-directional relative to horizontal wind flows, as well as being relatively immune to static pressure errors induced by angle-of-attack variations that deviate from the horizontal particularly in environments contaminated by dust, snow and rain.

Significant vertical wind components occur with flows deflected from obstacles, also with turbulence and a variety of organized instabilities in the atmospheric boundary layer. Variable vertical wind components produce flows at an angle-of-attack different from that anticipated from typical local horizontal fields. Such angle-of-attack initiated dynamic pressure changes can cause significant errors in pressure measurements. In addition, atmospheric applications involve a requirement that the static pressure response of sensors should be independent of horizontal wind direction, unidirectional static pressure probes not proving useful.

Some of the prior art constructions that have been employed to provide a solution to this problem have involved the following structural arrangements: a single disk mounted flush with the top of a hollow static pressure stem wherein the stem is disposed in either a perpendicular or parallel orientation relative to the disk; and, porous or sintered material caps placed on the open end of a static pressure stem.

In addition, much research has been devoted to dual disk static pressure probe configurations as evidenced by the following articles: "An Omni-Directional Static Pressure Probe" by Richard W. Miksad; *Journal of Applied Meteorology* Vol. 15, Number 11 (November 1976 pages 1215 thru 1225; and, "Development and Testing of a No Moving Parts Static Pressure Inlet For Use On Ocean Buoys" by Gerald C. Gill in a paper published by the University of Michigan in August 1976.

In addition, to these scholarly dissertations the prior art is replete with myriad and diverse patented air pressure and velocity measuring probe configurations, as evidenced by the following U.S. Pat. No's: 4,056,001,3,956,932; 3,055,216; 3,520,184; 4,304,137; 4,559,835; 3,950,995; and, 3,686,937.

Despite all of the time, money, and research that has been devoted to providing a solution to this problem, to date no one has developed a workable omni-directional static pressure probe that is relatively immune to angle-of-attack variations. As a consequence, meteorologists have experienced a longstanding deficiency in their ability to monitor static pressure changes at remote tracking stations, which has hampered their ability in accurately forecasting sudden and dramatic weather changes.

With the current state of the art static pressure probes, too many variables inherent in both the construction and configuration of the probes per se, have produced static pressure errors of the magnitude that simply defy accurate prognostications based on the potential differences between the actual static pressure at the probe location and the static pressure that is being recorded by the probe instrumentation.

However, the quad disk static pressure probe apparatus that forms the basis of the present invention is believed to be the most accurate device that has been developed to date, particularly with regard to meteorologically acceptable static pressure error differentials at angle-of-attack deviations within the range of ±30° from horizontal.

SUMMARY OF THE INVENTION

Briefly stated, the quad disk static pressure probe that forms the basis of the present invention comprises outer disk units; inner disk units; and a collar unit all of which are operatively connected in a radially disposed fashion to a hollow static pressure stem unit.

The outer disk units comprise a pair of relatively large diameter outer disk members that are disposed above and below the inner disk units; wherein, the inner disk units comprise a pair of relatively small diameter disk members.

The collar unit is located between the inner disk units and comprises a generally closed cylindrical collar member having a plurality of enlarged fluid pressure ports disposed around the periphery of the upper and lower ends of the cylindrical collar member; wherein, the plurality of enlarged fluid ports are in open fluid communication with a plurality of relatively discrete static pressure ports that are formed in the periphery of the hollow static pressure stem unit.

When the wind passes through the static pressure probe a portion of the air flow will pass over the fluid pressure ports on both ends of the collar member. Any pressure differential between the upper and lower fluid pressure ports will tend to cancel out one another within the interior of the collar member.

Since the static pressure ports are positioned between the ends of the collar member, the air pressure transmitted through the static pressure ports into the interior of the stem unit will be the balanced average of the pressure through the various pressure ports; the static pressure within the stem unit will be measured by a remote static pressure sensor in the conventional manner for transmission to distant meteorological stations.

Given the fact that the upper and lower ends of the collar member are positioned in close proximity to the relatively large outer disk members, it is highly unlikely that significant amounts of rain, snow, wave tossed water, etc. will enter the fluid pressure ports in the collar member. It is even less likely that these potential contaminants will block the discrete static pressure ports in the stem unit, since the pressure ports in the collar member are oriented perpendicular to the orientation of the static pressure ports. In addition, due to the size and alignment of the fluid pressure ports in the collar member virtually all potential contaminants should fall by gravity through the pressure ports at the bottom of the collar member.

BRIEF DESCRIPTION OF THE DRAWINGS

These and other objects, advantages, and novel features of the invention will become apparent from the detailed description of the best mode for carrying out the preferred embodiment of the invention which follows; particularly when considered in conjunction with the accompanying drawings; wherein.

BEST MODE FOR CARRYING OUT THE INVENTION

Figure 1:
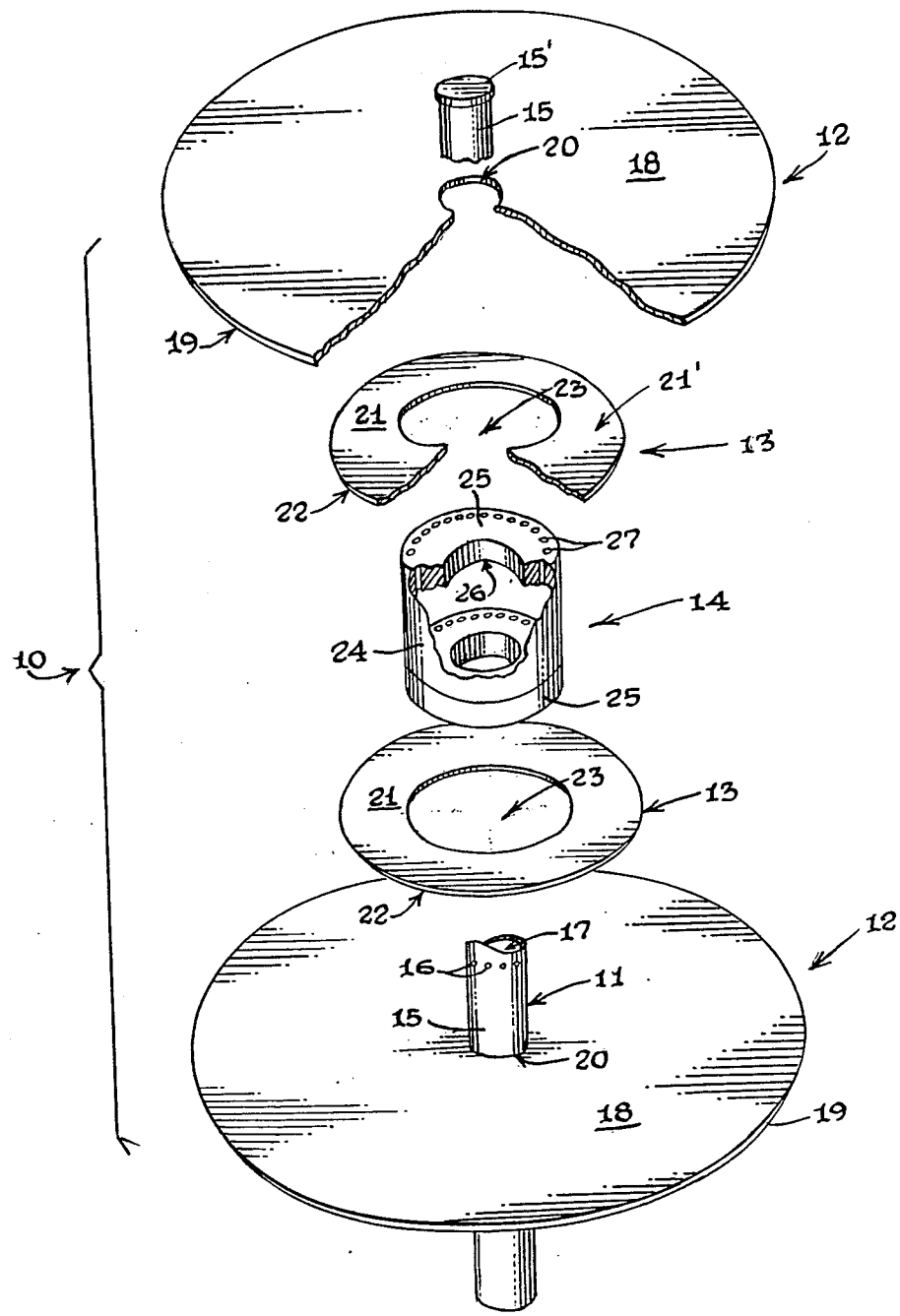
FIG. 1 is an exploded perspective view of the static pressure probe apparatus of this invention.

As can be seen by reference to the drawings and in particular to FIG. 1, the quad disk static pressure probe apparatus that forms the basis of the present invention is designated generally by the reference numeral (10). The static pressure probe apparatus (10) comprises in general: a static pressure stem unit (11); a pair of outer disk units (12); a pair of inner disk units (13); and, a collar unit (14). These units will now be described in seriatim fashion.

Figure 2:
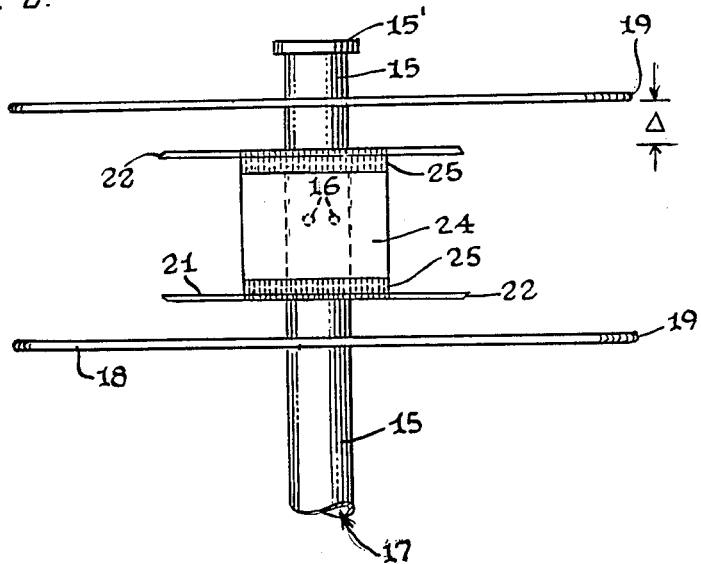
FIG. 2 is a side plan view of the apparatus.

As depicted in FIGS. 1 and 2, the static pressure stem unit (11) comprises an elongated hollow tubular stem member (15) having a plurality of relatively discrete static pressure ports (16) disposed in a ring around the periphery of the upper portion of the tubular stem member (15); wherein, the static pressure ports (16) are in open fluid communication with the interior (17) of the tubular stem member (15); and, wherein the static pressure within the interior (17) of the tubular stem member (15) is sensed by a remote static pressure sensor (not shown). In addition, the hollow stem member (15) is further provided with a stem cap (15') which seals to the upper end of the hollow stem member (15).

In the preferred embodiment of this invention the hollow stem member (15) is fabricated from a length of plastic pipe material such as polyvinyl chloride or the like, having a wall thickness of $\frac{1}{8}''$ and an inside diameter of $\frac{1}{2}''$; wherein, there are twelve equally spaced static pressure ports (16) disposed around the periphery of the stem member (15) and each of the discrete static pressure ports (16) has a diameter of 1/32".

As can also be seen by reference to FIGS. 1 and 2, the outer disk units (12) comprise a pair of relatively large generally flat thin outer disk members (18) having rounded edges (19) and a central aperture (20) that is dimensioned to seal to the periphery of the hollow stem member (15) at spaced locations on opposite sides of the static pressure ports (16).

In addition, the inner disk units (13) comprise a pair of relatively small generally flat thin inner disk members (21) having outwardly beveled edges (22) and an enlarged central aperture (23) whose purpose and function will be described in greater detail further on in the specification.

In the preferred embodiment of the invention depicted in the drawings the outer disk members (18) are approximately twice as wide and thick as the inner disk members (21); wherein, the outer disk members (18) are fabricated by acrylic material having a $\frac{1}{8}''$ thickness and a 6" diameter; and, wherein the inner disk members (21) are also fabricated from acrylic material having a 1/16" thickness and a $3\frac{1}{2}''$ diameter. It should also be noted at this juncture that the outer disk members (18) are spaced a distance "Δ" from the inner disk members (21) wherein the value of "Δ" is approximately equal to $\frac{3}{8}''$. Furthermore, the beveled edges (22) of the inner disk members (21) face the interior surfaces of the outer disk members (18); wherein the edges (22) are beveled at an angle of approximately 34°.

Still referring to FIGS. 1 and 2, it can be seen that the collar unit (14) comprises a generally cylindrical collar member (24) having apertured end caps (25); wherein the end caps (25) are provided with: an enlarged central aperture (26) that is dimensioned to sealingly engage the periphery of the hollow stem member (15) at equally spaced locations above and below the static pressure ports (16); and, a plurality of larger pressure port apertures (27) that are disposed at spaced locations around the periphery of the end caps (25).

It should also be appreciated at this juncture that the enlarged apertures (23) in the inner disk members (21) are dimensioned to seal to the periphery of the cylindrical collar member (24) adjacent the end caps (25) such that the outer surfaces (21') of the inner disk members (21) are mounted flush with the end caps (25) of the collar member (24).

Again in the preferred embodiment of this invention the collar member (24) will be fabricated from acrylic material wherein the collar member (24) will have: a length of $1\frac{1}{8}''$; a diameter of $1\frac{3}{4}''$; and a wall thickness of $\frac{1}{4}''$. In addition, the collar end caps (25) will also be manufactured from acrylic material having: a diameter of $1\frac{3}{4}''$ and a thickness of $\frac{3}{8}''$; wherein the plurality of pressure port apertures (27) will comprise thirty equally spaced radial apertures having a diameter of $\frac{1}{8}''$.

As was mentioned previously, the pressure probe apparatus (10) described herein provides a method for measuring static pressure under a variety of conditions. The dimensions of the various structural components are the result of a lengthy testing process designed to extend the range of angle-of-attack sensitivity. The spacing of the inner (21) and outer (18) disk members, the relative diameters, leading edge configurations, the sizes and positions of the ports (27) and (16) all proved to be important.

An overview of the physical processes involved is as follows. A flow at zero angle-of-attack will induce a small pressure change in the boundary layer of the inner disk members (21). The entry ports (27) at the periphery of the collar unit (14) will sense the average pressure at the inner disk members surface (21'). The static ports (16) around the circumference of the central stem member (15) will sense the pressure gradient between the upper and lower inner disk members (21).

As the angle-of-attack changes, such as when the upper disks are subjected to a component of increased, stagnation pressure, the inner disk members (21) will encounter pressures of opposite polarities. The lower inner disk will ideally have an average negative pressure equal to the stagnation pressure average on the surface of the upper inner disk. The static ports (16) on the central hollow stem member (15) will further reduce any "error" gradient pressure change, acting like a "summing junction" for the upper and lower disk members (21) which are also averaging surface pressure distributions with the rings of static pressure ports (16). The function of the outer disks is to shape the flow and extend the range of angle-of-attack prior to flow separation.

The foregoing design of the apparatus (10) was guided analytically and "fine-tuned" experimentally. One important feature is that the probe response is not sensitive to the fine details of the geometry and no specially shaped surfaces (e.g. dimples) are machined on the inner disk surfaces.

The static pressure probe apparatus (10) is also weather resistant in the sense that the upper disks act as rainshields and in addition the upper ports (27) of the collar unit (14) will permit any water to pass through to the lower ports (27) and to the ground without blocking the static ports.

It should also be emphasized at this juncture that all of the structural components of the apparatus (10) are fabricated from plastic and/or acrylic material to minimize the deleterious effects of salt water and other hostile environments.

Figure 3:
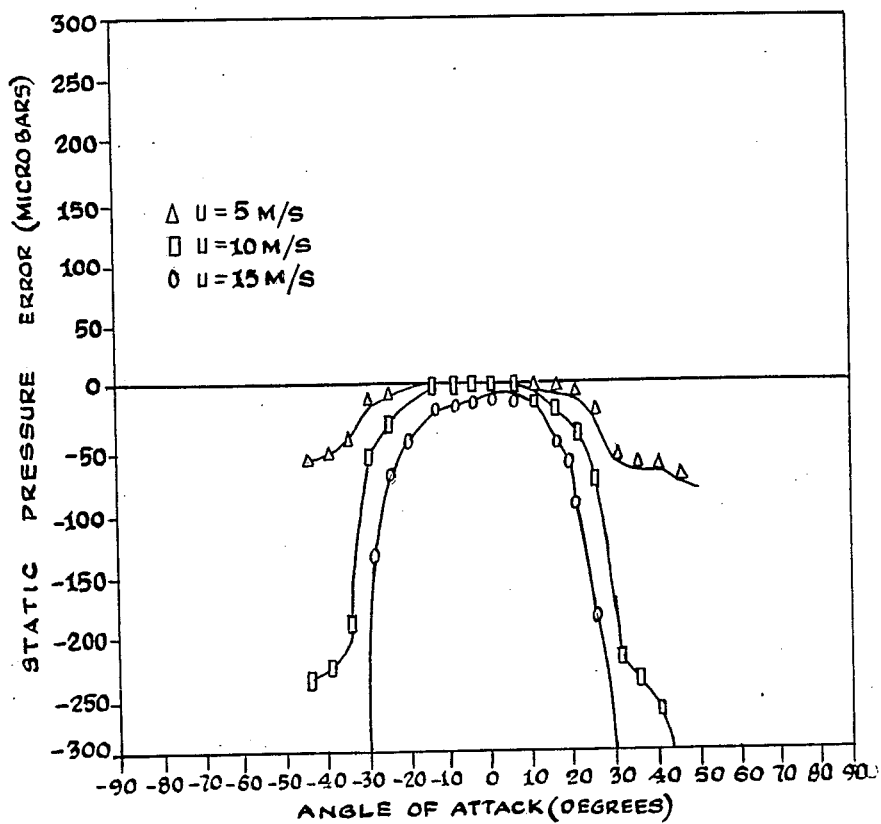
FIG. 3 is a plot of the performance characteristics of the apparatus under different angles of attack and air speeds.

Turning now to FIG. 3, it can be seen that the static pressure error induced by the changing angle-of-attack of wind passing over the apparatus (10) is excellent when the wind speed U equals 5 meters per second between $\pm 30°$ angle of attack. Furthermore, the static pressure error (in microbars) remains at acceptable levels with wind speeds U up to 15 meters per second, particularly in the range of $\pm 20°$ angle-of-attack. For example, in many applications an error in pressure of less than 50 microbars will be acceptable.

Having thereby described the subject matter of this invention, it should be apparent that many substitutions, modifications, and variations of the invention may be possible in light of the above teachings. It is therefore to be understood that the invention as taught and described herein is only to be limited to the extent of the breadth and scope of the appended claims.

We claim:

1. A static pressure probe apparatus comprising:
    an elongated hollow tubular stem member having a closed end and a plurality of static pressure ports disposed around the periphery of the tubular stem member;
    a generally cylindrical collar member provided with apertured end caps; wherein, each of the end caps are provided with an enlarged central aperture, that is dimensioned to sealingly engage the periphery of the tubular stem member at locations spaced from the static pressure ports in the tubular stem member; and, wherein each of the end caps are further provided with a plurality of pressure port apertures that are in open fluid communication with the static pressure ports in the tubular stem member; and,
    a plurality of disk members operatively associated with the tubular stem member.

2. The apparatus as in claim 1 wherein said plurality of disk members comprise:
    at least one pair of disk members wherein the disk members are disposed above and below the location of the static pressure ports in the tubular stem member.

3. The apparatus as in claim 1 wherein said plurality of disk members comprise:
    a pair of outer disk members disposed above and below the cylindrical collar member; and,
    a pair of inner disk members disposed intermediate the outer disk members and located above and below the static pressure ports in the tubular stem member.

4. The apparatus as in claim 3 wherein the outer disk members are spaced from the inner disk members.

5. The apparatus as in claim 4 wherein the inner disk members are mounted flush with the end caps of the collar member.

6. The apparatus as in claim 3 wherein the outer disk members are approximately twice the width and thickness of the inner disk members.

7. The apparatus as in claim 6 wherein the outer disk members are provided with rounded edges.

8. The apparatus as in claim 6 wherein the inner disk members are provided with beveled edges.

9. The apparatus as in claim 8 wherein the beveled edges of the inner disk members face the adjacent outer disk members.

10. The apparatus as in claim 1 wherein the plurality of pressure port apertures are disposed perpendicular to the alignment of the plurality of static pressure ports.

11. The apparatus as in claim 1 wherein all of the structural components of the apparatus are fabricated from plastic material.

* * * * *